Feb. 24, 1959 H. R. SHAW 2,874,829
TUBELESS TIRE COLLAPSIBLE BEAD STABILIZER
Filed March 21, 1957
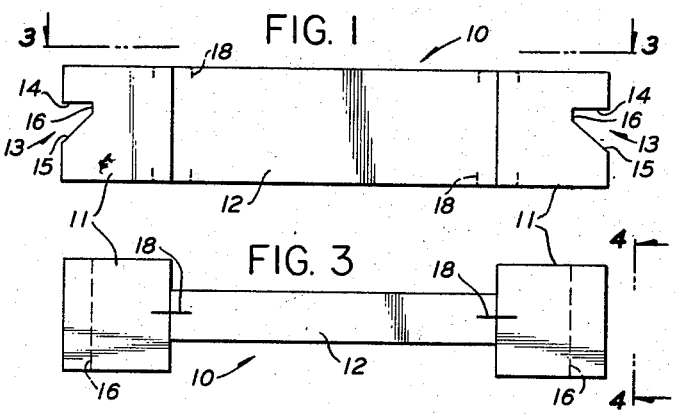
INVENTOR.
HAROLD R. SHAW
BY
ATTORNEY.

United States Patent Office 2,874,829
Patented Feb. 24, 1959

2,874,829

TUBELESS TIRE COLLAPSIBLE BEAD STABILIZER

Harold R. Shaw, Akron, Ohio, assignor to Willis F. Avery, Akron, Ohio

Application March 21, 1957, Serial No. 647,680

4 Claims. (Cl. 206—46)

This invention relates to a collapsible bead stabilizer for tubeless pneumatic tires and particularly to a collapsible bead stabilizer for the larger sizes of tubeless pneumatic tires, such as are used on trucks, tractors, earthmovers and the like vehicles.

The bead portions of a tubeless pneumatic tire are specially constructed to fit with an airtight seal against the rim of the wheel on which the tire is mounted. This requires the rim-contacting surfaces of a tubeless pneumatic tire to be smooth and true, that is, without flaw, warp or twist, and without any damaged surface areas, in order to keep the air under high pressure within the tubeless pneumatic tire from leaking out between the tubeless tire beads and the rim. Further, the two beads of a tubeless tire at the time of mounting on the rim should not only be equally spaced one from the other throughout the perimeter of the beads but also should be spaced the proper distance apart in order readily and effectively to assume the airtight seal against the rim. Normally, there is a preferable distance at the time of mounting between the beads of a tubeless tire for each size of rim and each size and type of tire. The collapsible bead stabilizers of this invention insure such smooth, true and equally and correctly spaced beads. While it is preferable that the collapsible bead stabilizers be inserted between the beads of the tubeless tire when the freshly cured tire is first removed from the tire vulcanizing press in a heated condition so that the tire is cooled with the beads held smooth and true and uniformly spaced apart at the proper distance for the particular use the tubeless pneumatic tire is to be put, the collapsible bead stabilizers may be inserted at a later period, as at the time the tubeless tires are placed in storage. The collapsible bead stabilizers are retained in place between the beads of the tire until the tire is to be mounted on a rim, at which time the collapsible bead stabilizers are collapsed and removed without damage to the beads.

Prior to the invention of this application, it was the common practice to remove a freshly cured tire from the mold, place it on a conveyor and remove it to a place of storage, where the tire would be piled with other tires in a stack of considerable height, in order to conserve storage space. Further, during the shipment of the tire to place of use, which normally requires two or more separate handlings, the tubeless tire, which requires its bead portions to retain in every respect the condition imparted to them in the vulcanizing mold, is frequently roughly handled resulting in a warping or twisting or distortion or other damage of the bead portions of the tire and the rim-contacting rubber surfaces of the bead portions, on which the sealing of the tubeless tire to the rim depends. The result is that the beads of the tubeless tire at time of mounting are not only not uniformly spaced apart at a proper distance, but often the beads of the tubeless tire are warped and/or twisted or the surface rubber of the bead portions otherwise damaged, and when the service men in the field mount or attempt to mount such a tubeless tire on a rim, all too frequently the force required to be applied to the beads by the tire mounting tools to bring the beads of the tubeless tire into sealing contact with the rim damages the bead portions of the tubeless tire to an extent that the tire has to be discarded.

Applicant has experimented extensively with single piece spreaders, cut to proper length and provided with bead-fitting notches at each end, and while such spreaders do to a degree accomplish the purpose of maintaining the beads uniformly spaced apart during cooling, storage and shipping, the removal of the spreaders damages such a high percentage of the bead portions of tubeless tires as to make the use of such spreaders uneconomical to use, especially with the higher priced, larger sizes of tubeless pneumatic tires.

It is an object of the present invention to provide a means for keeping the bead portions of large sized heavy tubeless pneumatic tires smooth and true and free from damage in handling, as well as to keep the beads properly and uniformly spaced throughout their perimeters and free of warps and twists during storage and shipment and up to the time the tubeless pneumatic tire is to be mounted on a rim; and, further, to provide for the removal of such means from the tubeless pneumatic tire without damage to, or distortion of, the bead portions of the tubeless pneumatic tire and hence, at the time of mounting the tubeless pneumatic tire on a rim, to provide a perfect air-sealing fit between the bead portions of the tubeless pneumatic tire and the rim on which the tubeless pneumatic tire is mounted.

It is a further object to provide a collapsible bead stabilizer comprising two bead-contacting members and an intermediate spacing member, each of the two bead-contacting members having in its outer surface portion a bead-fitting notch, and each being joined to the said intermediate spacing member by a connector means that permits a certain degree of relative movement, so that the bead-contacting member bears with substantially uniform pressure against the beads. The connector means is so constructed as to form a weak joinder between the bead-contacting members and the intermediate spacing member, such that, while it is strong enough to retain the collapsible bead stabilizer operatively within the tubeless pneumatic tire during storage and shipment and until removed for mounting the tubeless pneumatic tire on the rim, when it is desired to remove the collapsible bead stabilizer, a light tap of a hammer on the side of the intermediate spacing member will collapse the collapsible bead stabilizer, which may then be removed from between the beads of the tubeless pneumatic tire without any damage to the bead portions of the tubeless pneumatic tire.

Still further objects and advantages of the collapsible bead stabilizer of this invention will be apparent from the following specification and the accompanying drawing, in which Fig. 1 is a side elevational view of a preferred form of the tubeless tire collapsible bead stabilizer;

Fig. 2 is an end elevational view of the collapsible bead stabilizer of Fig. 1;

Fig. 3 is a top plan view of the stabilizer, as indicated by line 3—3 of Fig. 1;

Fig. 4 is an end view of the stabilizer, as indicated by line 4—4 of Fig. 2;

Fig. 5 is an elevational view of the wire staple used as a connector means between the bead-contacting members and the intermediate spacing member;

Fig. 6 is an end view, as indicated by line 6—6 of Fig. 5;

Fig. 7 is a perspective view of the collapsible bead stabilizer; the arrows indicating the general location of the spot to which a hammer blow is most effectively applied in collapsing the stabilizer;

Fig. 8 is a sectional view of a tubeless pneumatic tire showing one of the collapsible bead stabilizers in place between the beads of the tubeless pneumatic tire; and Fig. 9 is a perspective view showing a plurality of collapsible bead stabilizers in place between the beads of a tubeless pneumatic tire.

Referring more specifically to the drawing, the reference numeral 10 refers to the collapsible bead stabilizer as a whole, which is composed of two bead-contacting members 11 and an intermediate spacing member 12. Each of the two bead-contacting members 11 has a bead-fitting groove 13, the size and shape of the groove being determined by the normal cross-sectional size and shape of the inner edge portion of the bead of the pneumatic tubeless tire with which the collapsible bead stabilizer 10 is to be used. As shown, the groove 13 is defined by surface portion 14 disposed at right angles to the outer face of the bead-contacting members 11 of the stabilizer 10, and an oblique surface portion 15 converging inwardly toward the surface 14. The two surfaces 14 and 15 may meet at an angle, but it is usually preferable to have the surfaces 14 and 15 meet a narrow inner surface portion 16, normal to the surface 14, against which the inner tip of the bead may rest.

It is to be understood that the size and shape of the bead-fitting groove 13 needs to be such as will be complementary to the size and shape of the inner bead portion of the tubeless pneumatic tire to which the collapsible bead stabilizer is to be applied and that this groove 13 will vary in size and shape depending on the size, shape and construction of the bead portions of the tubeless pneumatic tire with which the collapsible bead stabilizer is to be employed. The term "bead-fitting groove" is employed herein in a generic sense to include grooves of any sizes and shapes which serve the purpose of this invention as hereinabove more fully set forth.

The intermediate spacing member 12 of the collapsible bead stabilizer 10 is preferably made of a thin material of the same height of the bead-contacting members 11 and of such length as may be necessary for the particular tubeless pneumatic tire with which the collapsible bead stabilizer is used.

For the large sized or giant tubeless pneumatic tires, it has been found to be satisfactory to make the bead-contacting members 11 as rectangular blocks about 4" x 4" x 4" in size, such as can be cut from regular 4" x 4" lumber, and the intermediate spacing member 12 cut from about 2" x 4" lumber to the proper length to give the collapsible bead stabilizer the desired over-all length. However, the invention is not limited to any specific material or to any particular sizes of the three members of the collapsible bead stabilizer 10, so long as the completed collapsible bead stabilizer meets with the above indicated requirements.

The means connecting the two bead-contacting members 11 and the intermediate spacing member 12 may be selected from any of the number of connecting means available for such purposes. Experience has shown that the most satisfactory connection is strong enough to hold the members 11, 12 together while the collapsible bead stabilizer is installed in the tubeless tire but is sufficiently weak that a tap of a hammer on the intermediate spacing member 12, and preferably near the juncture of the intermediate spacing member 12 and one of the bead-contacting members 11, will knock out the spacing member. Any means for so connecting the three members in the manner above described is herein referred to generically as "connector means."

As shown, the connector means consists of two-pronged wire staples 18 (see Figs. 1 to 7) driven into contiguous portions of the bead-contacting members 11 and the intermediate spacing member 12 so as to bridge the line of contact between the bead-contacting members and the spacing member. Preferably, four of such wire staples 18 are employed, as shown, although a greater or lesser number of the staples 18 may be employed. Other forms of staples adapted to join abutting wood members may be employed, such as staples having the reach between the two penetrating prongs arcuate, or corrugated staples, and the like. Normally, the staples 18 may be effectively applied by standard stapling machines.

Referring to Figs. 8 and 9, the manner in which the collapsible bead stabilizer 10 is applied to the beads B of the tubeless pneumatic tire T is illustrated. Upon removal of the tubeless tire from the vulcanizing mold, the carcass and beads of the tire are hot, and as the tire cools, the beads B normally are drawn more closely one to the other. Preferably, before the tire T has cooled, the collapsible bead stabilizers 10 are inserted between the beads of the tire, in a position shown in Fig. 8, and the collapsible bead stabilizers 10 are retained in that position until such time as the tubeless pneumatic tire is to be mounted on a rim. At that time, the service man gives a tap of the hammer to the intermediate spacing member 12, whereupon it breaks loose from the bead-contacting member 11, the latter then being free to be removed without injury to the beads of the tubeless pneumatic tire.

It is necessary to use a plurality of the collapsible bead stabilizers in each tubeless pneumatic tire in order to maintain the beads firm and true, that is, to keep the beads from warping and twisting, and at a desired uniform distance apart, during the periods of cooling, storage and shipping. Generally, four collapsible bead stabilizers substantially uniformly spaced, as about 90° apart, are sufficient. However, six or even eight may be used in giant tubeless pneumatic tires, such as those five feet tall or taller, and the number of collapsible bead stabilizers employed in any tubeless pneumatic tire becomes a matter of judgment and experience. In the specification and claims, the term "plurality of collapsible bead stabilizers" is intended to include three or more such stabilizers.

Although the foregoing specification and the accompanying drawing have described in detail and illustrated a preferred form of the invention of this application, it will be apparent to those skilled in the art that the invention is not so limited, but that various modifications may be made therein without departing from the spirit of the invention or from the scope of the appended claims.

What is claimed is:

1. A collapsible bead stabilizer for insertion between the two beads of a tubeless pneumatic tire so as to maintain the beads smooth and true and uniformly spaced apart during storage and shipment, which collapsible bead stabilizer comprises two bead-contacting members and an intermediate spacing member for said two bead-contacting members, the intermediate spacing member being a rectangular wood board having squared ends, each bead-contacting member being a rectangular wood block having a plane inner surface in contact with a squared end of the intermediate spacing member and an outer surface opposite to the inner surface and having a bead-fitting groove therein, the top and bottom surfaces of the rectangular wood board spacing member and the corresponding top and bottom surfaces of each of the wood block bead-contacting members being substantially in the same respective planes, and connector means for weakly joining each of the said wood block bead-contacting members to the said wood board spacing member comprising two-pronged ⊓-shaped staples each having relatively short penetrating prongs and each of which staples is driven into a portion of said wood spacing member and into a portion of each of said wood bead-contacting members, said portions being contiguous one to the other, through the said surfaces which are in substantially the same plane, whereby the members of the said collapsible bead stabilizer may be disconnected by a light blow of a tool on the said intermediate spacing member without damage to the tire beads.

2. A collapsible bead stabilizer for insertion between the two beads of a tubeless pneumatic tire so as to maintain the beads smooth and true and uniformly spaced apart during storage and shipment, which collapsible bead stabilizer comprises two bead-contacting members and an intermediate spacing member for said two bead-contacting members, the intermediate spacing member being a rectangular wood board having squared ends, each bead-contacting member being a rectangular wood block having a plane inner surface in contact with a squared end of the intermediate spacing member and an outer surface opposite to the inner surface having a bead-fitting groove therein, the top and bottom surfaces of the rectangular wood board spacing member and the top and bottom surfaces of wood block bead-contacting member being substantially in the same respective planes, and connector means for weakly joining each of the said wood block bead-contacting members to the said wood board spacing member, comprising two-pronged staples each having relatively short penetrating prongs and each staple bridging a line of contact between one of the said wood block bead-contacting members and the said wood board spacing member on the surfaces that are in substantially the same respective planes, one of the prongs of each of the two-pronged staples being driven into the wood board spacing member and the other of the prongs of each of the two-pronged staples being driven into the wood of a bead-contacting member, whereby the members of the said collapsible bead stabilizer may be disconnected by a light blow of a tool on the said intermediate spacing member.

3. A collapsible bead stabilizer for insertion between the two beads of a tubeless pneumatic tire so as to maintain the beads smooth and true and uniformly spaced apart during storage and shipment, which collapsible bead stabilizer comprises two bead-contacting members and an intermediate spacing member for said two bead-contacting members, the intermediate spacing member being a rectangular wood board having squared ends, each bead-contacting member being a rectangular wood block having a plane inner surface in contact with a squared end of the intermediate spacing member and an outer surface opposite to the inner surface having a bead-fitting groove therein, the top and bottom surfaces of the rectangular wood board spacing member and the top and bottom surfaces of the wood block bead-contacting member being substantially in the same respective planes, and connector means for weakly joining each of the said wood block bead-contacting members to the said wood board spacing member, comprising two-pronged staples, each staple having relatively short penetrating prongs and each staple bridging a line of contact between each of the said wood block bead-contacting members and the said wood board spacing member on the surfaces that are in substantially the same respective planes, one of the prongs of each of the two-pronged staples being driven into the wood board spacing member and the other of the prongs of each of the two-pronged staples being driven into the wood of a bead-contacting member so that a two-pronged staple bridges each of the four lines of contact between the two said wood block bead-contacting members and the said wood board spacing member which lines are in substantially the said same respective planes, whereby the members of the said collapsible bead stabilizer may be disconnected by a light blow of a tool on the said intermediate spacing member.

4. In combination, a vulcanized tubeless pneumatic tire of toroidal form having two rim-fitting beads which need be kept smooth and true and spaced at uniform distances apart throughout the peripheries thereof prior to mounting on a tire rim and a plurality of collapsible bead stabilizers inserted between the said two beads at spaced distances about the peripheries of the beads to maintain the beads smooth and true and uniformly spaced apart during storage and shipment, each of the said collapsible bead stabilizers comprising two bead-contacting members and an intermediate spacing member for said two bead-contacting members, the intermediates spacing member being a rectangular wood board having squared ends, each bead-contacting member being a rectangular wood block having a plane inner surface in contact with a squared end of the intermediate spacing member and an outer surface opposite to the inner surface and having a bead-fitting groove therein, the top and bottom surfaces of the rectangular wood board spacing member and the corresponding top and bottom surfaces of each of the wood block bead-contacting members being substantially in the same respective planes, and connector means for weakly joining each of the said wood block bead-contacting members to the said wood board spacing member comprising two-pronged ⊓-shaped staples each having relatively short penetrating prongs and each of which staples is driven into a portion of said wood spacing member and into a portion of each of the said wood bead-contacting members, said portions being contiguous one to the other, through the said surfaces which are in substantially the same plane, whereby the members of the said collapsible bead stabilizer may be disconnected by a light blow of a tool on the said intermediate spacing member without damage to the tire beads.

References Cited in the file of this patent

UNITED STATES PATENTS

| | | |
|---|---|---|
| 1,375,065 | Raynaud | Aug. 19, 1921 |
| 1,459,476 | Meredith | June 19, 1923 |
| 1,718,959 | Hubbard | July 2, 1929 |
| 1,821,234 | Parker | Sept. 1, 1931 |
| 2,573,664 | Herzegh | Oct. 30, 1951 |
| 2,754,961 | Wilson | July 17, 1956 |